Feb. 6, 1940. G. T. PFLEGER 2,189,294
VARIABLE SPEED TRANSMISSION DEVICE
Original Filed July 27, 1936  2 Sheets-Sheet 2
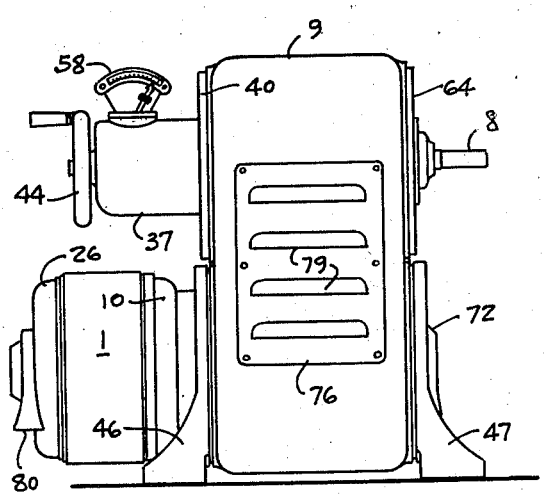
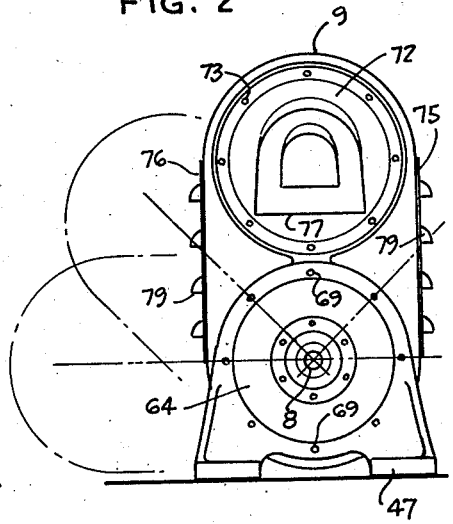
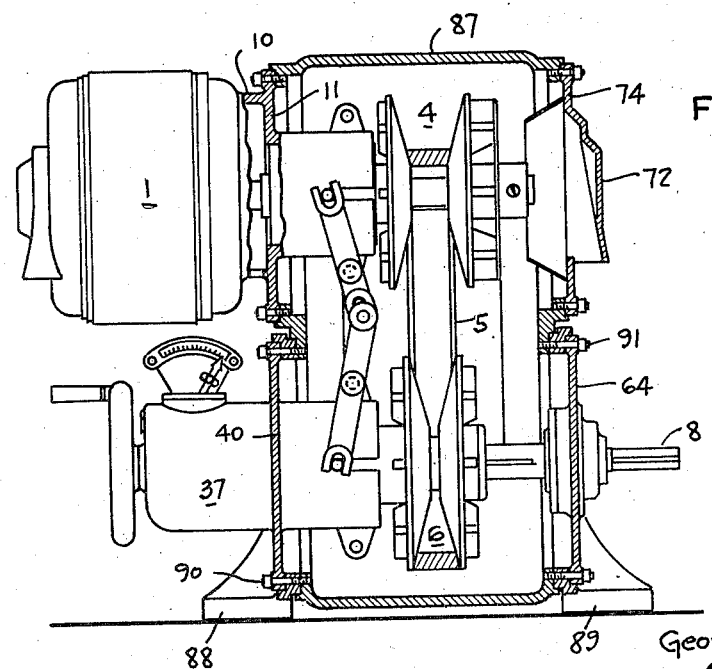
INVENTOR
George T. Pfleger
BY John Flam
ATTORNEY Patented Feb. 6, 1940

2,189,294

UNITED STATES PATENT OFFICE 2,189,294

VARIABLE SPEED TRANSMISSION DEVICE

George T. Pfleger, Los Angeles, Calif., assignor to U. S. Electrical Motors, Inc., Los Angeles, Calif., a corporation of California Application July 27, 1936, Serial No. 92,752
Renewed November 8, 1937

8 Claims. (Cl. 74—230.17)

This invention relates to a mechanism for varying the speed ratio between a driving and a driven shaft, the mechanism being supported in a frame or casing. A transmission of this character is described and claimed in a copending application, Serial No. 34,049, filed in the name of Don Heyer on July 31, 1935, and entitled: Variable speed transmission device. This copending application is assigned to the same assignee as the present application.

The mechanism for varying the speed ratio involves, in the present form, a variable diameter pulley structure. This structure includes a pair of pulley sections each in driving relation to a shaft, and having opposed inclined belt engaging faces. The belt, being wedge shaped in section, has its sloping sides respectively in driving contact with the inclined faces; and a variation in the effective pulley diameter is secured by providing for relative axial adjustment between the sections. When the faces are brought closer together, the belt travels radially outwardly of the axis, to provide an increase in the effective pulley diameter. Conversely, when the faces are separated, the belt travels radially inwardly of the axis, to provide a decrease in the effective pulley diameter.

Transmissions of this general character are now in general use. They may include pulley structures such as described on both the driving and driven shafts; or the belt may engage a fixed diameter pulley on one of the shafts. If one pulley only is adjustable, the variation in required belt length can be appropriately compensated as by belt tighteners, or by correspondingly varying the center distance between the driving and driven shafts. The variable diameter pulley structure can be arranged to be varied in response to the variation in center distance, or it can be positively adjusted.

If both the driving and driven pulley structures are of the variable type, one or both can be positively adjusted; when but one is so arranged, the other can be automatically adjusted as by a spring or other resilient means.

In the prior filed application referred to hereinabove, a variable transmission mechanism is described in which the casing enclosing the transmission may be angularly adjusted about the axis of one of the shafts, whereby the relative positions of the load and of the mechanism may be chosen to correspond to a desired layout. It is one of the objects of the present invention to provide another form of mechanism for securing the same general results.

It is another object of the invention to make it possible to interchange the driving and driven pulley structures with respect to the casing, whereby the angular position of the axis of either the driving or the driven shaft may be adjusted about the axis of the other shaft, which may be fixed in position.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawings:

Fig. 2 is an end elevation of the embodiment shown in Fig. 1, and illustrates the manner in which the angular position of one of the shafts may be varied with respect to the axis of the other shaft;

Fig. 3 is a side elevation similar to Fig. 1, showing the position of the driving and driven shafts interchanged from the position shown in Fig. 1; and Fig. 4 is a side elevation partly in section of another form of variable speed transmission embodying the invention.

Figure 1:
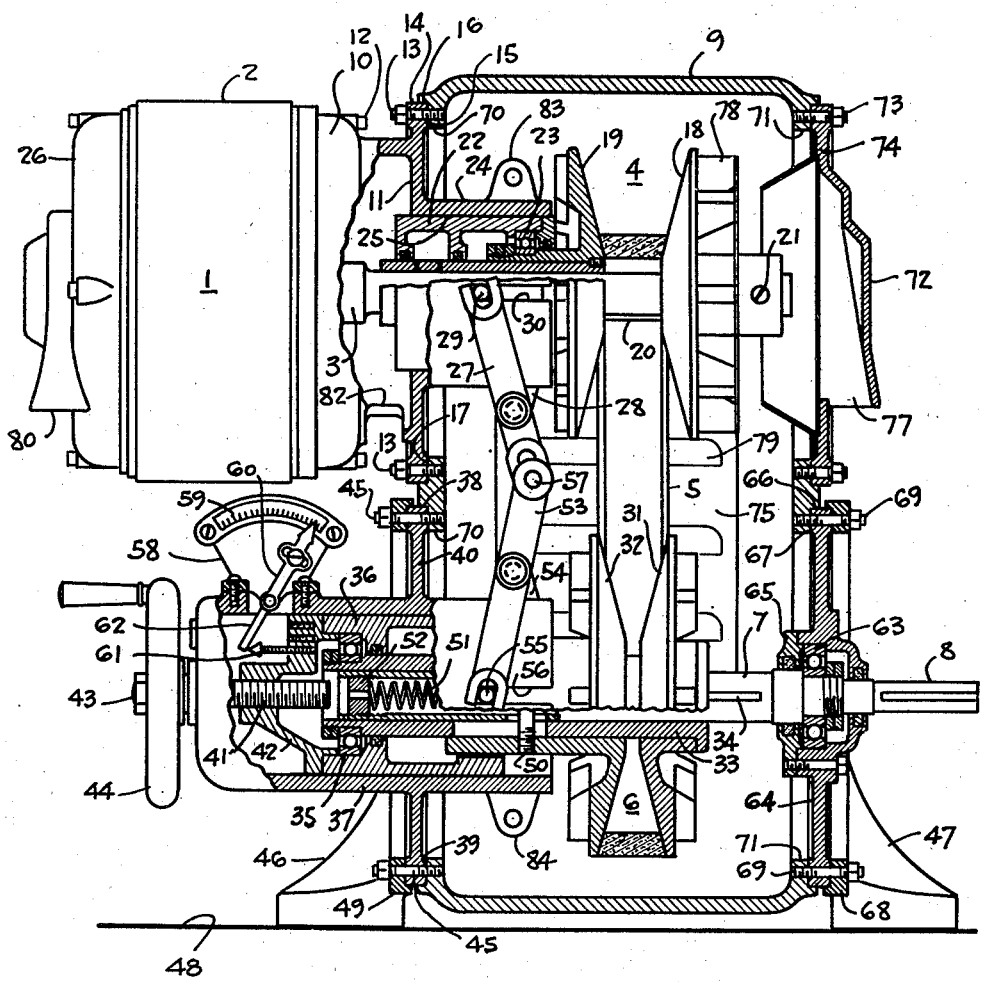
Figure 1 is a side elevation partly in section of one form of variable speed transmission embodying the invention.

In the form shown in Figs. 1, 2 and 3, positive means are provided for adjusting the effective diameter of both the driving and driven pulley structures, as well as supplemental means for adjusting the belt tension and for compensating for belt wear.

The variable speed power unit is provided with a driving electric motor 1, having the frame 2 and a rotor which is in driving relation to the motor shaft 3. This motor shaft is in driving relation with the adjustable pulley structure 4, which by means of the belt 5, drives another adjustable pulley structure 6 mounted on the driven shaft 7. This driven shaft is provided with the load driving extension 8 which projects to the exterior of the casing or frame 9 enclosing the belt and pulley structure.

The driving motor 1 is supported by the aid of the motor adapter bracket 10. This motor adapter bracket is shown as integral with a flange 11, serving to support the motor adapter bracket 10, as well as the means for adjusting the effective diameter of the driving pulley and the bearing support for the shaft 3. The frame of the motor 1 can be suitably secured to the adapter bracket 10 by the aid of the bolts 12 which pass through member 10, and which may be threaded into the frame of the motor. The flange 11 is in turn secured to the casing 9 by the aid of the studs 13 which pass through the flange 11, and which are threaded into the walls of the casing 9. The flange 11 is accurately located with respect to the casing 9 by means of the engagement of the external cylindrical surface 14 and the radial surface 15 formed on the flange 11, respectively with the internal cylindrical surface 16 and the radial surface 17 formed on the casing 9.

The driving pulley structure 4 includes the pulley sections 18 and 19 which are suitable splined to the motor shaft 3 as by means of the key 20. The pulley section 18 may be secured to the motor shaft by the set screw 21, which passes through the pulley hub and which engages the shaft surface. The effective diameter of the pulley structure 4 is adjusted by moving the pulley section 19 toward or away from the pulley section 18. The axial position of the pulley section 19 is adjusted by means of the axially adjustable bearing housing 22 which engages the bearing 23 secured to the hub of the pulley section 19. The flange 11 has a cylindrical extension 24 formed thereon which is provided with the internal cylindrical surface 25 for supporting the axially adjustable bearing housing 22 for axial movement. The bearing 23 also provides means for rotatably supporting one end of the motor shaft 3. The other end of the motor shaft is supported by means of a bearing suitably secured within the end bell 26 of the motor.

The axial position of the bearing housing 22 is adjusted by the forked lever 27, which is pivotally supported on the extending ear 28 formed on the cylindrical extension 24 and which engages the oppositely positioned pins 29 secured to the bearing housing 22. The cylindrical extension 24 is provided with the slots 30 which allow the pins 29 to move axially but which restrains the rotation of the bearing housing 22.

The driven pulley structure 6 includes the pulley sections 31 and 32 which are in driving relation to the load driving shaft 7. The pulley section 31 is provided with the long bushing 33 which is suitably splined to the driven shaft 7 by means of the key 34. The pulley section 32 may in turn be suitably splined to the bushing 33 by means of a key (not shown) angularly displaced from the key 34. The bushing 33 has the thrust and radial bearing 35 secured thereto, which provides means for axially adjusting the pulley section 31. The bearing 35 is held within the axially adjustable bearing housing 36, which in turn is supported by the control housing 37. This control housing has a flange 40 which is supported on the frame or casing 9 by means of the cylindrical and radial surfaces 38 and 39 formed on the casing 9. These supporting surfaces 38 and 39 are identical in size and configuration with the supporting surfaces 16 and 17 provided for the support of the flange 11 associated with the driving pulley structure.

The axial position of bearing housing 36 may be adjusted by an appropriate speed control mechanism such as the rotatably supported lead screw 41 which threadedly engages the bearing cap 42 of the bearing housing 36. The lead screw 41 has an extension 43 projecting outwardly of the housing 37, and to which may be secured the handwheel 44. Rotation of handwheel 44 and of the lead screw 41 secured thereto results in a corresponding axial adjustment of the bearing housing 36 and of the associated pulley section 31. The supporting flange 40 is shown as attached to the wall of casing or frame 9 by the aid of the studs 45 threaded into the casing 9 and passing through the flange 40. These studs 45 also serve to secure one of the two supporting standards 46 and 47 for supporting the casing or frame 9 on a stationary surface or base 48. Supporting standard 46 is thus provided with a flange 49 having cylindrical and radial surfaces engaging the edge of the flange 40. The studs 45 pass through the flange 49 and they accordingly serve to fasten together the standard 46, flange 40 and casing 9. However, this supporting means is detachable in order to permit an interchange of flange 11 with flange 40, as illustrated in Fig. 3. In this way the positions of the driving and driven shafts 3 and 7 may be interchanged with respect to the casing 9.

The pulley section 32 may, if desired, be fixed to the driven shaft 7. However, in the present instance this pulley section is so arranged that it may provide for compensating for belt wear and for determining the initial belt tension. For this purpose the hub of the pulley section 32 is provided with the radial pin 50 which passes through appropriate slots formed in the driven shaft 7 and in the bushing 33. The pulley section 32 is urged into contact with the driving belt 5 by means of the compression spring 51 which is interposed between the screw plug 52 and pin 50. The driven shaft 7, of course, is appropriately made hollow at its left hand end for the accommodation of this spring 51 and the screw plug 52. The force exerted by the spring 51 can be adjusted by the rotation of the screw plug 52, and this spring may be suitably designed to provide a coaxial force sufficiently great to maintain the pulley sections 31 and 32 in active driven relation to the belt 5 under the greatest load normally encountered.

Suitable means are provided for interlocking the adjustment of the driving and driven pulley structures, so that they may both be positively adjusted. In the present instance the forked lever 53 is provided which is pivotally supported on the extending ear 54 on the control housing 37. This forked lever 53 engages the oppositely positioned pins 55 secured to the bearing housing 36. The control housing 37 is provided with the slots 56 which permit the axial movement of pins 55, but which restrain rotation of the bearing housing 36. By the aid of this construction an axial movement of bearing housing 36 results in a pivotal movement of forked lever 53. Movement of forked levers 27 and 53 is interlocked by the common pivot pin 57, which is secured to the forked lever 53, and which engages the slotted end of lever 27. The forked levers 27 and 53 may be so proportioned that an increase in the effective diameter of one of the pulley structures results in a compensating decrease in the effective diameter of the other pulley structure.

It is apparent that the effective diameters of the driving and driven pulley structures 4 and 6 are simultaneously adjusted to vary the speed ratio of the variable speed power unit when the lead screw 41 is rotated by the manipulation of the handwheel 44.

The adjustment of the speed ratio may be indicated by the speed indicator 58, which is removably secured to the control housing 37. This speed indicator is provided with a graduated scale 59 and the pivotally mounted pointer 60, which is actuated by the head of the screw 61 secured to the bearing housing 36. A suitable torsion spring (not shown) is provided for maintaining the end 62 of the pointer in contact with the head of the screw 61. Axial movement of the bearing housing 36 thus results in a corresponding pivotal movement of the pointer 60.

One end of the driven shaft 7 is supported by the bearing 35. The other end of this driven shaft is supported by the bearing 63, which is held within the bearing housing formed by the cover plate 64 and the bearing cap 65. A cover plate 64 is in the form of a detachable flange secured to the wall of casing 9, and is accurately rotated with respect to the casing by the engagement of the internal cylindrical surface 66 and the radial surface 67 formed on the casing which engage corresponding cylindrical and radial surfaces formed on the flange 64. The cylindrical and radial surfaces 66 and 67 may in every way be equivalent in size and design to the cylindrical and radial surfaces 38 and 39 provided for supporting the control housing 37.

The standard 47 is detachably secured to the flange 64 and to the casing 9 in the same manner as standard 46 is secured to the corresponding flange 40 and casing 9. Thus this standard 47 is provided with a ring flange 68 having cylindrical and radial surfaces in contact with the edge of the flange 64; and a series of studs 69 used for fastening the parts 9, 64 and 68 together.

The casing 9 is provided with apertures 70 and 71 respectively formed adjacent to the control housing 37 and the flange 64. These apertures provide substantial access to the interior or casing 9. When it is desired to replace the driving belt, the cover plate 64 may be removed and the belt passed over the end of the driven shaft 7; or the pivot pin 57, which interlocks the levers 27 and 53, may be removed, after which the control housing 37 may be removed to permit the passing of the belt 5 over the end of the bearing housing 36.

The casing 9 is also provided with the aperture 70 adjacent to the flange 11 formed on the motor adapter bracket 10 and another aperture 71 formed in the opposite facing wall. The aperture 71 is covered by the detachable bracket 72 which is removably secured to the wall of the casing by the aid of a plurality of studs 73 passing through the flange 74 of the bracket 72. The flange 74 is of the same diameter as flange 64 and can be interchanged therewith as required when there is an interchange between the two shafts 3 and 7. This interchanged position is thus completely illustrated in Fig. 3. The driving belt 5 may be readily removed from the driving pulley structure by the removal of the bracket 72, after which the belt may be passed over the end of the driving shaft 3.

To provide additional access to the belt and pulley structures, the opposite side walls of the casing 9 have apertures formed therein which are provided with the removable cover plate 75 and 76 (Figs. 2 and 3).

To provide means for cooling the belt and pulley structures, the bracket 72 has a downwardly directed air intake passage 77 formed thereon, through which air may be drawn into the casing 9 by means of the fans 78 rotated with the driving pulley structure 4. The air may be discharged from the casing through the downwardly directed air discharge passages 79 formed in the cover plates 75 and 76.

The motor ventilation may be maintained by means of the air intake passage 80 formed on the end bell 26 and the downwardly directed air passage 82 formed in the adapter bracket 10.

It is apparent that due to the interchangeability of flanges 11 and 40, as well as the interchangeability of flanges 74 and 64, the position of the motor 1 with its driving shaft 3 and pulley structure 4 can be interchanged with the position of the driven pulley structure 6 and its control mechanism. Under such circumstances the motor 1 is located adjacent the standard support 46, as illustrated in Fig. 3.

In order to ensure that this position may be interchanged without the necessity of disturbing the direction of the air opening 80, the cylindrical extension 24 joined to flange 11 is provided with a second set of ears 83 diametrically opposite to the ears 28. Similarly, the control housing 37 is provided with a supplemental set of ears 84 diametrically opposite the ears 54. In this way when the driving and driven shafts are interchanged to the position shown in Fig. 3, the ears 83 and 84 are used to support respectively the levers 27 and 53.

The casing 9 may be angularly adjusted about the axis of that shaft which is supported adjacent the standard supports 46 and 47. Thus in the form of Fig. 1, the casing 9 can be angularly moved about the axis of shaft 7 and held in any of a plurality of different angular positions. This can be accomplished by merely adjusting the casing 9 with the attached flanges 40 and 64 angularly in the bearing supports 46 and 47. For example, the studs or bolts 45 can be removed in order to accomplish this result, and they can be replaced in the new position. There may be as many studs 45 and 69 disposed uniformly around the circle as desired, the increment of adjustment in that case corresponding to the angular spacing of the studs. Fig. 2 illustrates an angular spacing of the studs 69 as 45°; accordingly, the casing 9 can be adjusted to comply with either of the two dot and dash lines indicated. Intermediate adjusting positions can be provided for by providing tapped holes in the casing 9 intermediate those illustrated; in this case the studs or bolts 45 and 69 can optionally engage any set of alined apertures.

The position of the casing 9 can also be similarly adjusted when the positions of the driving and driven shafts 3 and 7 are interchanged, as shown in Fig. 3. In this form it is possible to adjust the position of the load driving shaft 8 to fit a particular installation.

The handwheel 44, of course, stays in operative position for any angular position of the control housing 37. The speed indicator 58 is detachably secured to this control housing 37, and pointer 60 is substantially in the plane of the axes of the driving and driven shafts. If the casing 9 happens to be so positioned that the scale 59 is not visible, the speed indicator 58 may be removed and the torsion spring reversed after which the indicator 58 may be turned around to bring the scale 59 into view.

In the form shown in Fig. 4, a casing 87, similar to casing 9, encloses the variable diameter pulleys 4 and 6 together with belt 5 and supports motor 1 and speed control mechanism in a housing 37, as in the first form. Supporting standards 88 and 89 are secured to casing 87 by bolts 90 and 91. Standards 88 and 89 are similar to standards 46 and 47, but are arranged to be secured between the casing and flange 40 or 64 as the case may be instead of on the outside thereof. The position of the motor and the position of the driven pulley structure may be interchanged, and casing 87 may be angularly adjusted about the axis of that shaft adjacent the supporting standards, all exactly as before.

What is claimed is:

1. In a variable speed transmission device, a driving shaft, a driven shaft, pulley structures respectively in driving relation to the shafts, and a casing for supporting and enclosing said structures, so that the axes of the shafts are in spaced parallel relation, said casing including common means for optionally supporting either one of the shafts, as well as for providing a standard for the casing, said standard being adapted to be secured to the casing at any of a number of angular positions about the axis of supported shaft.

2. In a variable speed transmission device, a driving shaft, a driven shaft, pulley structures respectively in driving relation to the shafts, and a casing for supporting said structures, so that the axes of the shafts are in spaced parallel relation, said casing having a standard, said standard having an axis, bearing structures for the shafts, said bearing structures being so arranged that either shaft may be optionally supported axially of the standard, said casing being adjustably mounted on the axis of the standard so that the casing may optionally assume any of a number of angular positions with respect to said axis.

3. In a variable speed transmission mechanism, a driving shaft, a driven shaft, pulley structures respectively in driving relation to the shafts, a casing enclosing said structures, flanged bearing supports detachably mounted on opposite walls of the casing for rotatably supporting said shafts, said bearing supports being interchangeable whereby the positions of said shafts with respect to the casing may be interchanged, and a standard cooperating with the flanges of either set of bearing supports for supporting the casing in any of a number of angular positions with respect to the axis of that shaft, the bearing supports of which cooperate with the standard.

4. In a variable speed transmission mechanism, a driving shaft, a driven shaft, pulley structures respectively in driving relation to the shafts, a frame for the mechanism, sets of bearing supports for the shafts, detachably secured to the sides of the frame, and interchangeable in position with respect to the frame, and a standard support for the frame optionally associated with either set of the bearing supports and adapted to support the frame in any of a number of angular positions with respect to the axis of that shaft the bearing supports of which are associated with the standard.

5. In a variable speed transmission mechanism, a driving shaft, a driven shaft, pulley structures respectively in driving relation to the shafts, at least one of said pulley structures having an adjustable effective diameter, a frame for the mechanism, sets of bearing supports for the shafts, detachably secured to the sides of the frame, and interchangeable in position with respect to the frame, a speed change mechanism for adjusting the effective diameter of said adjustable pulley structure and supported by one of the bearing supports for the shaft associated with said adjustable pulley structure, and a standard support for the frame optionally associated with either set of the bearing supports and adapted to support the frame in any of a number of angular positions with respect to the axis of that shaft the bearing supports of which are associated with the standard.

6. In a variable speed transmission mechanism, a driving shaft, a driven shaft, pulley structures respectively in driving relation to the shafts, a frame for the mechanism, sets of bearing supports for the shafts, detachably secured to the sides of the frame, and interchangeable in position with respect to the frame, an electric motor in coaxial driving relation to the driving shaft and supported by the corresponding bearing support, and a standard support for the frame optionally associated with either set of the bearing supports and adapted to support the frame in any of a number of angular positions with respect to the axis of that shaft the bearing supports of which are associated with the standard.

7. In a variable speed transmission mechanism, a driving shaft, a driven shaft, pulley structures respectively in driving relation to the shafts, a casing enclosing said pulley structures, sets of bearing supports for the shafts, detachably secured to the walls of the casing, and interchangeable in position with respect to the casing, an electric motor in coaxial driving relation to the driving shaft and supported by the corresponding bearing support so as to be exterior of the casing, and a standard support for the casing optionally associated with either set of the bearing supports and adapted to support the casing in any of a number of angular positions with respect to the axis of that shaft the bearing supports of which are associated with the standard.

8. In a variable speed transmission mechanism, a driving shaft, a driven shaft, pulley structures respectively in driving relation to said shafts, bearing structures for the shafts, a frame, and a standard, said standard having an axis, said frame being arranged to support the bearing structures so that the axes of the shafts are in spaced parallel relationship, said frame being adapted to have the standard secured thereto coaxially with either shaft, whereby the shafts may be interchanged in position with respect to the standard, said frame also being arranged so that it can be rotated about said axis, whereby the angular relationship between the shafts and the standard may be altered.

GEORGE T. PFLEGER.